June 20, 1961   E. J. FRENCH ET AL   2,989,618
ELECTRIC RESISTANCE HEATING AND FORMING OF ARTICLES
Filed March 14, 1958
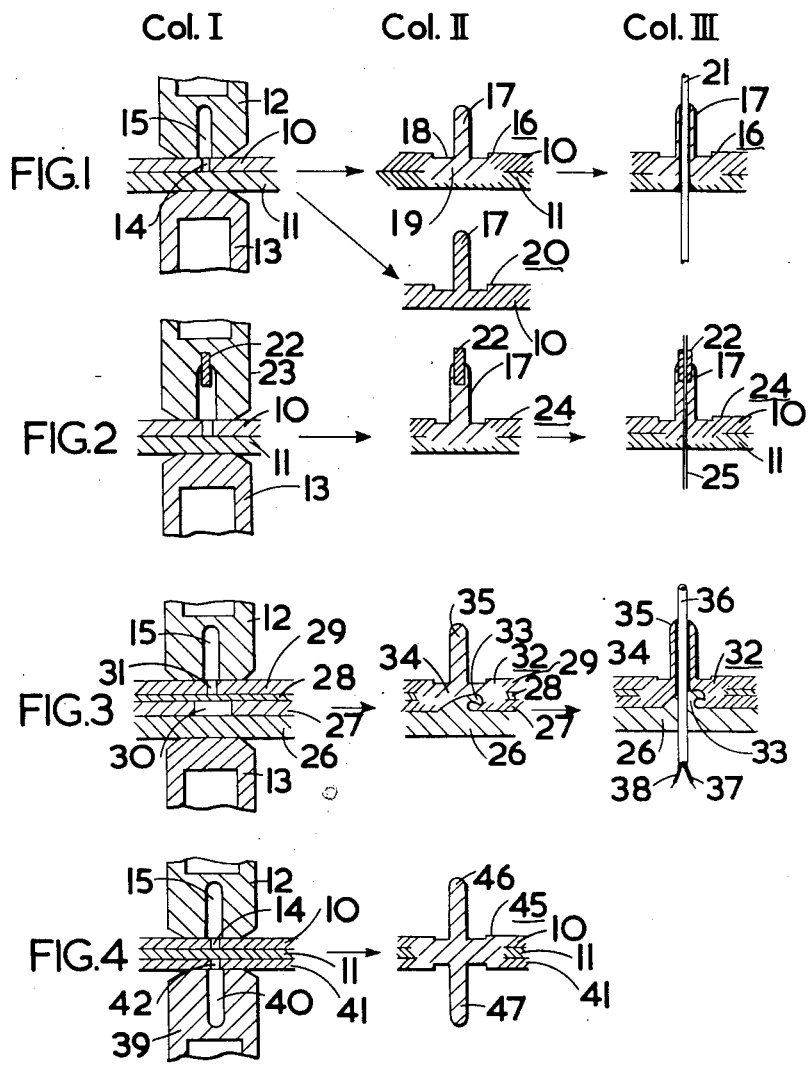
INVENTORS
ERNEST JOHN FRENCH
MALCOLM DOUGLAS HANNAH
BY
ATTORNEYS United States Patent Office 2,989,618
Patented June 20, 1961

2,989,618
ELECTRIC RESISTANCE HEATING AND
FORMING OF ARTICLES
Ernest John French and Malcolm Douglas Hannah, Cambridge, England, assignors to the United Kingdom Atomic Energy Authority, London, England
Filed Mar. 14, 1958, Ser. No. 721,603
5 Claims. (Cl. 219—149)

This invention relates to electrical resistance heating and forming of metal articles.

The invention is based on our discovery that if two metal sheets are compressed together between two electrodes, one of which is provided with a cavity on its face in contact with one of the sheets, and a current is passed through the sheets from the electrodes in the fashion of spot welding, then metal from the sheets flows into the cavity to create an extended surface or projection on one metal sheet together with welding together of the sheets.

In exploring this discovery further we have found that by inserting a suitable high melting point or cooled peg in the cavity in the electrode, the extended surface will bond to the peg as the extended surface is formed. This potentially provides a method of sealing one metal member A in passage through a second metal member B where the metals A and B are not suitable for sealing with each other but which will both seal with an intermediate metal C, the metal C being that of the peg.

Extending the invention further it has also been discovered that two metals may be keyed together, most probably with a seal, the metals being regarded normally as difficult to weld together: for example, magnesium and titanium. The steps for achieving this keying are to build up a stack comprising a magnesium base sheet, a titanium sheet perforated by a small hole, an unperforated titanium sheet and a top titanium sheet with a hole about the same size as the cavity in the electrode; and to pass a current through the stack with the cavity of the electrode above the hole in the top sheet when an extended surface appears in the cavity and the magnesium rises in the hole in the perforated sheet and then curles over and keys into the melted titanium. This again potentially provides a method of sealing a metal member A (such as a stainless steel rod) in passage through a plate of metal B (magnesium for example) by interpositioning of a metal C (titanium) which can be joined to both stainless steel and magnesium.

The invention is accordingly stated as residing in a resistance heating and forming of a metal article characterised in that the resistance heating is carried out by passing an electric current through the article when compressed between electrodes, at least one of the electrodes having a cavity on its face so that metal can flow from the article into the cavity to form a projection.

For nearly all uses of the invention the depth of the cavity will be greater than the width of the cavity. Preferably the article is in the form of two sheets of metal, the one next to the cavity electrode having a small perforation aligned with the cavity. This allows an easy passage of material from the region of the sheet interface into the cavity. The cavity can be provided in either electrode. If projections are required on both sides of the article then both electrodes are provided with a cavity and both sheets have a small perforation aligned with the cavities in the electrodes. When, however, the thickness of the two sheets is insufficient to supply the required double projection volume of metal without causing undue indentation of the sheets, a third sheet can be interposed between the two sheets to provide the required additional material.

The cavities can take a variety of shapes. One of circular section is generally useful but one providing a projection of aerofoil section can be used for making extended surface heat exchangers.

Articles made according to the invention may have a variety of uses. A single projection may be used to provide a boss through which a wire or tube may be securely brazed. A large number of projections on a flat surface or on the inside and outside of a tube may be used to form a heat exchanger. A hollow panel structure may be made by forming a number of projections on a sheet, and resistance welding a sheet to the projections.

Examples carrying the invention into effect and articles made according to the invention will now be described with reference to the accompanying drawings which are all sectional elevations. FIGURES 1 to 4 showing in three columns numbered I to III respectively a resistance heating and forming process, a primary product and, when appropriate, a secondary product.

In FIG. 1, Col. I, two sheets 10, 11 are clamped between two water cooled welding electrodes 12, 13. The sheet 10 has a small perforation 14 which is aligned with a cavity in the form of a blind hole 15 in electrode 12.

In FIG. 1, Col. II (upper figure), the primary product is shown. The plates 10, 11 have become welded together in the zone marked 19 and a projection 17 has been produced on the plate 10 with a circular indentation 18 at the foot of the projection caused by the pressure of the welding electrode 12. The projection 17 is approximately the same size as the hole 15 in the electrode 12 and is produced by metal from sheet 10 becoming plastic or molten with a passage of current between the electrodes. In a typical example, the sheets 10, 11 are No. 14 gauge deep drawing steel, the welding current is 30,000 amperes and the load between the electrodes is 2000 pounds. The hole 14 is 5/32" diameter, the hole 15 is 3/16" diameter and has a depth of 1/2".

In FIGURE 1, Col. II (lower figure), the product 20 is obtained by using material in plates 10 and 11 which do not weld with each other or are surface prepared so that they do not weld. After formation of the projection 17 the sheet 11 is readily separated from the sheet 10 and its projection.

In FIGURE 1, Col. III, there is shown the product 16 drilled and fitted with a tube 21. The tube is brazed into the product 16. The product 20 could, of course, be similarly treated.

In FIGURE 2, Col. I, operations similar to those described in FIGURE 1, Col. I, are shown with the addition of a copper peg 22 which has been inserted with a light push fit into a hole provided in the electrode 23. The material of sheets 10 and 11 is titanium. The product 24 shown in FIGURE 2, Col. II is like product 16 but possesses the copper peg 22 sealed in the projection 17. In Col. III the plug 22 and product 24 are shown drilled and fitted with a stainless steel wire 25 which is brazed in the plug 22 so that it is sealed in passage through the plates 10, 11.

In FIGURE 3, Col. I, four layers of metal are inserted between electrodes 12, 13. The bottom layer 26 is magnesium 0.10" thick and the next layer 27 is titanium 0.064" thick and provided with a hole 30 of 0.375" diameter. The third layer 28 is titanium 0.036" thick and the top layer 29 is titanium 0.064" thick with a perforation 31 of 5/32" diameter.

On passing a welding current of 30,000 amperes between the electrodes and on providing a load between the electrodes of 2000 pounds, an article 32 (Col. II) is obtained. This article consists of a magnesium plate 26 having a hook shaped projection 33 which is enclosed in the fused part 34 of the three titanium sheets so as to be keyed into the part 34. A projection 35 of titanium is also obtained. It is thought that a seal exists between the plate 26 or its hook 33 and the fused part 34.

In FIGURE 3 (Col. III) a stainless steel sheathed thermocouple cable 36 having two conductors 37, 38 is shown passing through the projection 35, fused part 34, hook 33 and magnesium sheet 26. The sheath of the cable 36 is brazed to the projection 35.

In FIGURE 4 (Col. I) the bottom electrode 39 has been provided with a cavity 40 and a third metal sheet 41 having a perforation 42 has been introduced. On passing a current between the welding electrodes 12, 39, an article 45 (Col. II) is obtained.

This article is provided with projections 46, 47 both above and below the sheets 10, 11, 41. The sheet 11 could be omitted if the volume of metal flowing to fill the cavities 15, 42 would not cause undue indentation of the sheets 10 and 41.

We claim:

1. A process of resistance heating and forming a metal article which comprises resistance heating a stack of at least two metal sheets compressed between a first electrode defining a cavity on its face and a second electrode by passing an electric current through the sheets and the electrodes, the metal sheet adjacent to said first electrode defining a perforation open to the cavity and smaller in cross-section than both the cavity and the second electrode so that metal can flow into the cavity to form a projection.

2. A process as claimed in claim 1 wherein said stack comprises at least three sheets, said second electrode defines a cavity on its face and the metal sheet adjacent to said second electrode defines a perforation open to and smaller in cross-section than the cavity in said second electrode.

3. A process as claimed in claim 1 wherein a removable peg is held in the cavity during the passage of the current.

4. A process of resistance heating and forming a metal article comprising the steps of compressing a metal sheet between a first electrode having a cavity in its face of depth greater than its width and a second electrode, and passing a current through the electrodes and the sheet so that the sheet is fused in a zone below the cavity and injected into the cavity to form a projection on the sheet having a length greater than its width.

5. A process of resistance heating and forming a metal article which comprises resistance heating a stack of four metal sheets compressed between a first electrode defining a cavity on its face and a second electrode by passing an electric current through the sheets and the electrodes, the first metal sheet being adjacent to said first electrode and defining a perforation which is open to the cavity and smaller in cross-section than both the cavity and the second electrode so that metal can flow into the cavity to form a projection, the second and fourth sheets being unperforated in the region of the electrodes, and the third sheet defining a perforation within the area compressed by the electrodes at least twice as large in cross-section as the perforation in said first sheet.

References Cited in the file of this patent

UNITED STATES PATENTS

| | | |
|---|---|---|
| 1,259,275 | Murray | Mar. 12, 1918 |
| 1,261,943 | Lashar | Apr. 9, 1918 |
| 1,339,966 | Murray et al. | May 16, 1921 |
| 1,380,250 | Reymond | May 31, 1921 |
| 1,504,367 | Meadowcraft | Aug. 12, 1924 |
| 1,658,056 | Phelps et al. | Feb. 7, 1928 |
| 1,744,810 | Shallcross | Jan. 28, 1930 |
| 2,108,795 | Budd | Feb. 22, 1938 |

FOREIGN PATENTS

| | | |
|---|---|---|
| 245,232 | Great Britain | Jan. 7, 1926 |
| 987,343 | France | Apr. 11, 1951 |